United States Patent

Wood et al.

[15] 3,663,184

[45] May 16, 1972

[54] SOLDER BUMP METALLIZATION SYSTEM USING A TITANIUM-NICKEL BARRIER LAYER

[72] Inventors: John Richard Wood, Sunnyvale; John D. Wright, Mountain View, both of Calif.

[73] Assignee: Fairchild Camera and Instrument Corp., Mountain View, Calif.

[22] Filed: Jan. 23, 1970

[21] Appl. No.: 5,445

[52] U.S. Cl. ....................29/195

[51] Int. Cl. ....................B32b 15/00

[58] Field of Search ....................29/195 S, 198

[56] References Cited

UNITED STATES PATENTS

| | | | |
|---|---|---|---|
| 3,037,180 | 5/1962 | Linz | 29/195 S |
| 3,141,226 | 7/1964 | Bender | 29/195 S |
| 3,287,612 | 11/1966 | Lepselter | 29/195 S |
| 3,361,592 | 1/1968 | Quetsch | 29/195 S |
| 3,395,993 | 8/1968 | Bristow | 29/198 |
| 3,409,809 | 11/1968 | Diehl | 29/195 S |
| 3,480,412 | 11/1969 | Duffek | 29/195 S |

*Primary Examiner*—Hyland Bizot
*Attorney*—Roger S. Borovoy and Alan H. MacPherson

[57] ABSTRACT

Solder bumps, for use in connecting electrically-conductive contacts on a semiconductor die to electrical leads on an underlying substrate, each include a barrier layer of metal adhering to a die contact, a wettable layer of metal placed over the barrier layer of metal, and solder adhering to the wettable layer of metal. In addition, an intermetallic layer is formed between the barrier metal and the wettable metal to increase the strength and diffusion resistance of each bump.

4 Claims, 10 Drawing Figures

INVENTORS
J. RICHARD WOOD
JOHN D. WRIGHT
BY Alan H. MacPherson
ATTORNEY

INVENTORS
J. RICHARD WOOD
JOHN D. WRIGHT
BY Alan H. MacPherson
ATTORNEY

INVENTORS
J. RICHARD WOOD
JOHN D. WRIGHT

BY Alan H. MacPherson
ATTORNEY

SOLDER BUMP METALLIZATION SYSTEM USING A TITANIUM-NICKEL BARRIER LAYER

BACKGROUND OF THE INVENTION

1. Field of the Invention

This invention relates to semiconductor devices and in particular to both a solder bump structure and to a process for the placement of a plurality of such solder bumps on a semiconductor die.

2. Description of the Prior Art

An integrated circuit incorporates a large number of interconnected elements, such as transistors, diodes, resistors, and capacitors, on a slice of semiconductor material, typically silicon. To provide electrical contact with these elements, numerous electrically-conductive contacts are attached to these elements, or, in the case of transistors and diodes, to the various P and N regions of these elements. These contacts, though often formed from a single layer of conductive material and selectively interconnected to provide the desired operation of the integrated circuit, are in general separated from each other and the remainder of the elements on the semiconductor slice by insulation. This semiconductor slice, together with its overlying layers of insulation and metal contacts, is hereafter called a "die."

In the manufacture of integrated circuits, a large number of dies are usually processed together, as part of a single "wafer" of semiconductor material. After the desired integrated circuits have been formed on the various dies contained in the wafer, the wafer is cut up into its constituent dies. The integrated circuit or circuits on a die must then be connected to the other circuits outside the die with which they are designed to operate. Typically, this is done by bonding lead wires from selected portions of the electrically-conductive contacts on the die to metal contact layers on one surface of a support substrate. Such bonding, whether by ultrasonic or thermo-compression welding techniques, usually proceeds on a lead-by-lead basis and thus is time consuming and expensive.

To replace these lead wires, the prior art has developed a technique using solder bumps. To produce these solder bumps — and these bumps are typically produced before the wafer is cut into dies — an insulating layer is deposited over the thin film electrically-conductive contacts attached to the elements on each die in the wafer. Windows are etched through the insulating layer to the underlying contacts and then layers of an appropriate wettable metal, such as chromium-copper, are evaporated over the insulation and the windows. The metal is then selectively removed from all areas except over the windows so as to form metal pads over these areas. Next, metallic bumps are formed on the wafer. After the wafer has been cut into dies, bonding is accomplished by placing each die face down on a matching support substrate and applying heat and/or pressure. Dies so bonded are called "flip chips."

Unfortunately, often this technique results in unreliable bonds because the foreign metals — such as chromium or nickel — used in fabricating such solder bumps can readily consume the underlying thin conductive contacts and cause mechanical or electrical degradation of these contacts.

A solder bump which overcomes the unreliable bond of the prior art is disclosed in U.S. Pat. No. 3,480,412, issued Nov. 25, 1969, to Edward F. Duffek and Ilan A. Blech, and assigned to Fairchild Camera and Instrument Corporation, the assignee of this application. Duffek and Blech disclose solder bumps containing a nickel barrier layer between the overlying solder and the underlying aluminum metallization on the semiconductor die. The nickel layer is actually separated from the aluminum contacts by a thick pedestal of aluminum. Thus the length of time necessary for the nickel to migrate through the aluminum to the interface of the aluminum with the underlying insulation — typically silicon dioxide — where it weakens the contact between the aluminum and silicon dioxide, is increased. Thus the nickel-aluminum pedestal lengthens the device lifetime.

However, the solder bump structure disclosed by Duffek and Blech is produced by a complicated, expensive process.

SUMMARY OF THE INVENTION

This invention substantially overcomes these problems of the prior art and of the Duffek and Blech solder bump. The solder bumps of this invention have a somewhat longer life than the solder bumps disclosed by Duffek and Blech, and maintain good electrical and mechanical properties throughout their lifetime. The solder bumps of this invention can be simultaneously placed on contact pads on carefully specified areas of an integrated circuit die while the die is still part of the wafer. The bumps of this invention melt in the temperature range of 361° F to 625° F. During bonding, the solder bumps of this invention melt and flow to compensate for surface uneveness in the underlying substrate. And the bumps of this invention are produced by a simpler process than are the bumps of the Duffek and Blech invention and thus have appreciably lower production costs.

According to this invention, a barrier layer of metal and a wettable layer of metal are placed between the solder and the underlying electrically-conductive contact pad on the semiconductor die. The metal barrier layer, typically titanium, forms a diffusion barrier between the overlying metal layers and the underlying contact pad thus preventing migration of selected metals, including nickel and most solder constituents, into the contact pad. On the other hand, the wettable metal layer, typically nickel, is an excellent wettable base for most tin or lead-containing solders.

In one variation of this invention, an intermetallic layer is formed between the barrier and wettable metal layers. This intermetallic layer offers additional resistance to the migration of metals thus preventing the wettable metal and selected solder constituents from migrating into the underlying contact pad. This intermetallic layer also significantly improves the adherence of the wettable metal to the barrier metal.

When titanium and nickel are used as the barrier and wettable metals, respectively, the solder bump of this invention is formed by first placing a titanium layer onto the semiconductor wafer. When a nickel-titanium intermetallic layer is desired, nickel and titanium are next simultaneously placed on the wafer. Finally, a nickel layer is formed on the titanium, or the nickel-titanium intermetallic layer, as the case may be. The nickel, titanium and intermetallic layers are then masked and those portions of these layers not overlying the contact pads to the semiconductor die are removed. Then solder is placed on the exposed nickel surfaces. Typically, though not necessarily, this is done by dipping the semiconductor wafer into a molten bath of solder, such as tin-lead solder. The solder adheres to the wettable surface of the exposed nickel layer but runs off the remainder of the wafer. The result is a semiconductor wafer containing a plurality of solder bumps formed on layers of titanium, nickel and intermetallics thereof, overlying the contact pads on the wafer.

Semiconductor dies containing the solder bumps of this invention are easily bonded to support substrates. The resulting bonds have high reliability and strength. Thus the bumps of this invention have significant and unexpected advantages over the bumps of the prior art.

DESCRIPTION OF THE PREFERRED EMBODIMENTS

While the method and structure of this invention will be described in terms of lead-tin solder placed on a silicon wafter overlaid by a layer of silicon dioxide and a contact layer of aluminum, it should be understood that other solders, semiconductors, insulation layers and electrically-conductive contact layers, can also be employed using the principles of this invention. Such other systems might, for example, use a gold-tin-gold, or a lead-tin-gold, or a gold-indium-gold solder. Furthermore, while for simplicity, this invention is described by showing in the figures only a portion of a semiconductor wafer with a single solder bump thereon, rather than a whole wafer, it should be understood that in implementing this invention, a plurality of solder bumps are placed upon each die in a wafer being processed, rather than just a single solder bump.

Figure 1A:
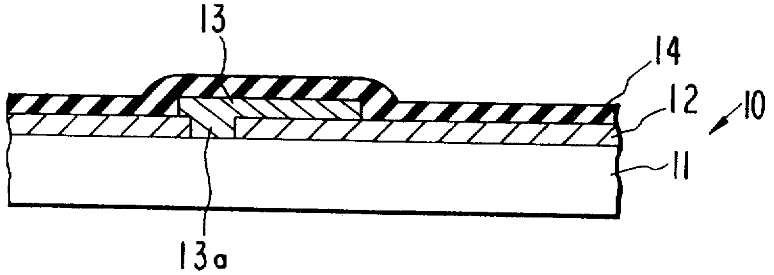
FIGS. 1*a* through 1*d* show one embodiment of this invention using a titanium-nickel barrier layer between the underlying device metallization and the overlying solder.

FIG. 1*a* shows a portion of wafer 10 consisting of silicon 11 with an overlying insulating layer 12, usually silicon dioxide. Electrically-conductive layer 13, typically aluminum although other electrically-conductive materials can also be used, overlies silicon dioxide 12. Layer 13, composed of many electrically-isolated and selectively interconnected sections of aluminum, only one section of which is shown, makes selected electrical contact through windows, such as window 13*a*, in silicon dioxide 12, with the elements, or with the P and N regions of the transistors and diodes (not shown) previously produced within the silicon 11. Wafer 10 is of a type well-known in the semiconductor arts and can contain many integrated circuit dies.

As shown in FIG. 1*a*, a layer 14 of insulation, typically a silicon oxide produced from the decomposition of silane and oxygen, is formed over first insulating layer 12 and aluminum metallization layer 13. Insulation 14 is typically about one micron thick although any reasonable thickness can be used. Windows, such as window 23 (FIG. 1*b*), are etched in this layer by well-known techniques to expose a portion of the top surface of the underlying contact metal 13.

Figure 1B:
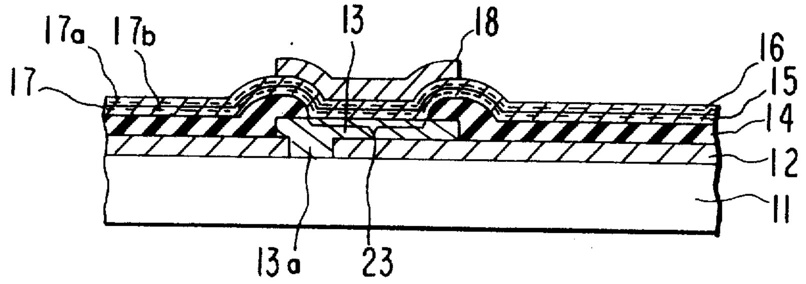

Next, as shown in FIG. 1*b*, a layer of titanium 15 and then a layer of nickel 16 are placed over insulation layer 14. Intermediate these two layers a titanium-nickel intermetallic layer is often formed. These metal layers adhere to underlying metal contact layer 13 through window 23. In one embodiment these layers are evaporated, using an electron beam source. The wafer, heated to about 300° C, is placed in a chamber evacuated to $10^{-6}$ to $10^{-7}$ Torrs. First a layer 15 of titanium, about one-half micron thick, is evaporated over insulation layer 14. When a titanium-nickel intermetallic layer 17 is to be formed, a titanium-nickel mixture next may be co-evaporated, often without stopping the evaporation of the titanium, to produce an intermediate layer of titanium-nickel two-phase mixtures. In the figures, layer 17 is represented by the material between dashed lines 17*a* and 17*b*. Intermediate layer 17 is usually about one-half micron thick, although other thicknesses are also appropriate, and contains intermetallic compounds such as $Ti_2Ni$, TiNi, and $TiNi_3$. Then, the evaporation of the titanium is stopped while the nickel is evaporated until a separate nickel layer 16, usually about one micron thick, is formed over titanium-nickel intermetallic layer 17. Alternatively, intermetallic layer 17 may be formed by well-known alloy processes after nickel layer 16 has been formed on titanium layer 15, thereby avoiding co-evaporation of titanium and nickel.

Titanium-nickel intermetallics are hard, somewhat brittle, have a high melting temperature and provide a diffusion barrier to the migration of most metals, including lead, tin, gold and nickel. The titanium itself adheres well to aluminum, the most commonly used electrically-conductive contact metal, and is also an effective barrier to the migration of overlying nickel to the underlying electrically-conductive contact layer. Prevention of the migration of most solder constituents, such as lead, gold or copper, is essential to preserve the performance characteristics of the underlying semiconductor devices. The titanium-nickel intermetallic also greatly increases the strength of the bond between the nickel and titanium layers. The strength of this bond must be high if the bump is to survive the thermal stresses created by different thermal expansion of the die and the support substrate.

Figure 1C:
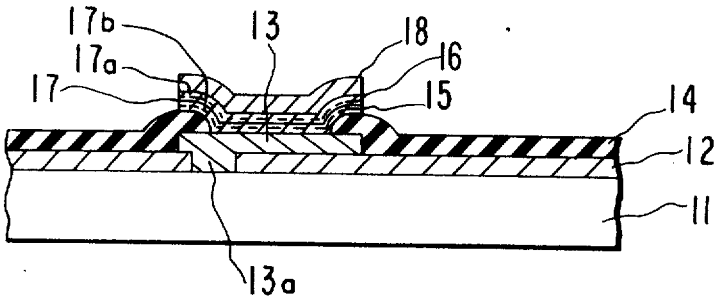

A selected photoresist 18, such as KMER, is next placed on the top surface of the nickel, and selectively removed except over those portions of titanium-nickel layers 15, 16 and 17 to be left on the wafer to serve as a pedestal for the solder. The wafer is then etched to remove the unwanted portions of the nickel, titanium and intermetallic layers, as shown in FIG. 1*c*. To etch the nickel 16, a 50 percent nitric acid, 5 percent sulfuric acid solution at 100° C is used for approximately 15 seconds. To etch the titanium-nickel mixture 17 and the titanium 15, a 50 percent sulfuric acid etch at 120° C is used for about 30 seconds. The etched wafer is rinsed in deionized water and the resist 18 overlying the titanium-nickel pedestal layers 15, 16 and 17 left at the bump locations is stripped, using, for example, J-100, a commercial stripper. This is followed by an acetone rinse.

Next, an electroless nickel plating is sometimes used to replenish the surface of the nickel layer 16. This step is optional, however, and can be omitted, if desired.

Figure 1D:
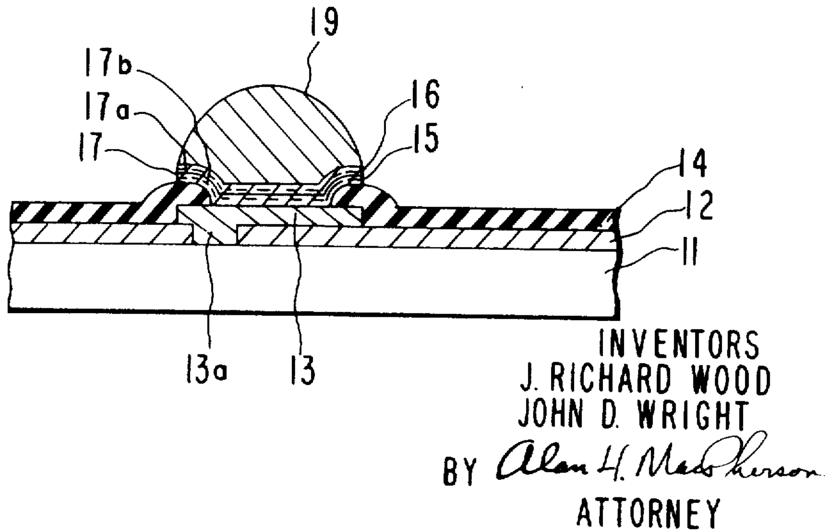
Figure 3:
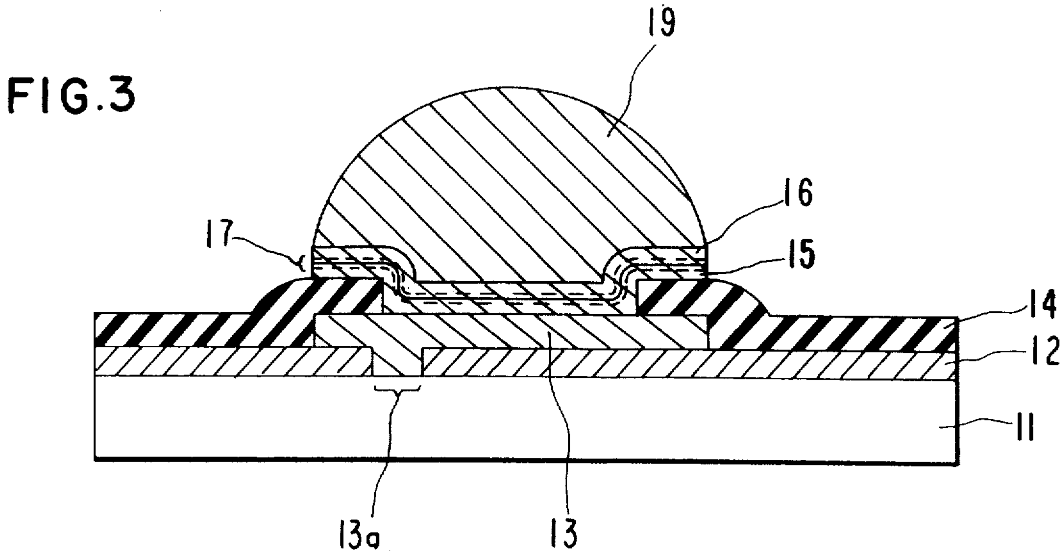
FIG. 3 shows a solder bump produced by the process shown in FIGS. 1*a* through 1*d*.

Finally, the wafer is dipped into a solder, typically a lead-tin solder with a flux. A suitable flux is Alpha 611 although other fluxes may also be used. After the solder dip, the wafer is rinsed to remove any remaining flux, and the wafer appears as shown in FIG. 1*d*. Lead-tin intermixed solder 19 rests on titanium-nickel-intermetallic layers 15, 16 and 17 respectively. Layer 15 in turn adheres to and makes contact with underlying electrically-conductive contact pad 13 which in turn contacts an underlying region of semiconductor 11 through a window 13*a* in insulation 12. This structure is shown more clearly in FIG. 3.

Figure 2A:
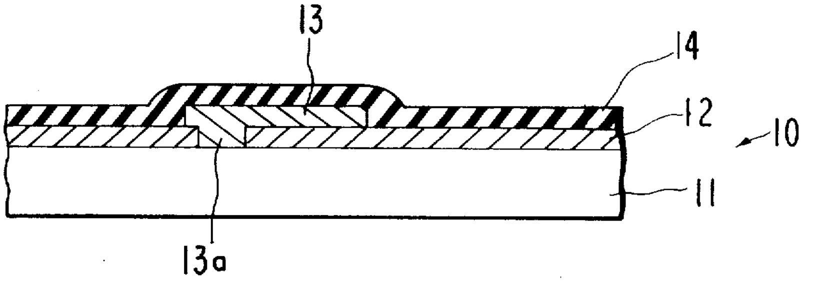
FIGS. 2*a* through 2*d* show the second embodiment of the process of this invention for producing a solder bump using a gold layer on top of the nickel-titanium barrier layer.
Figure 2B:
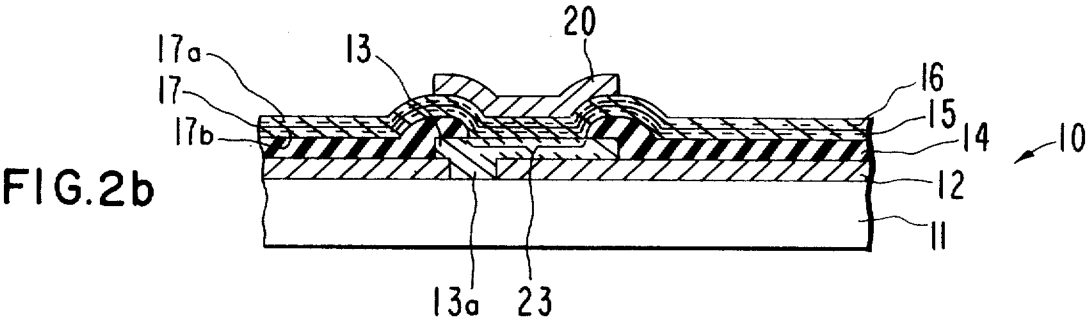
Figure 2C:
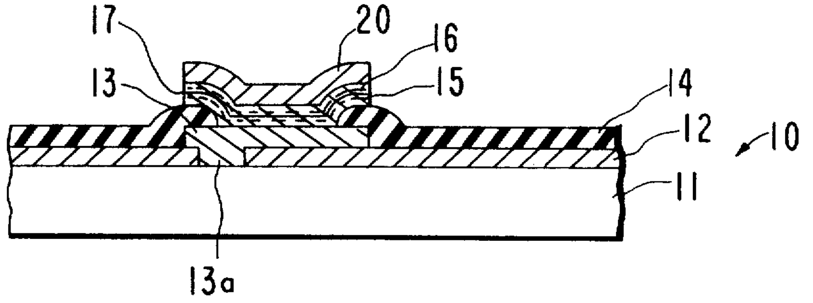
Figure 2D:
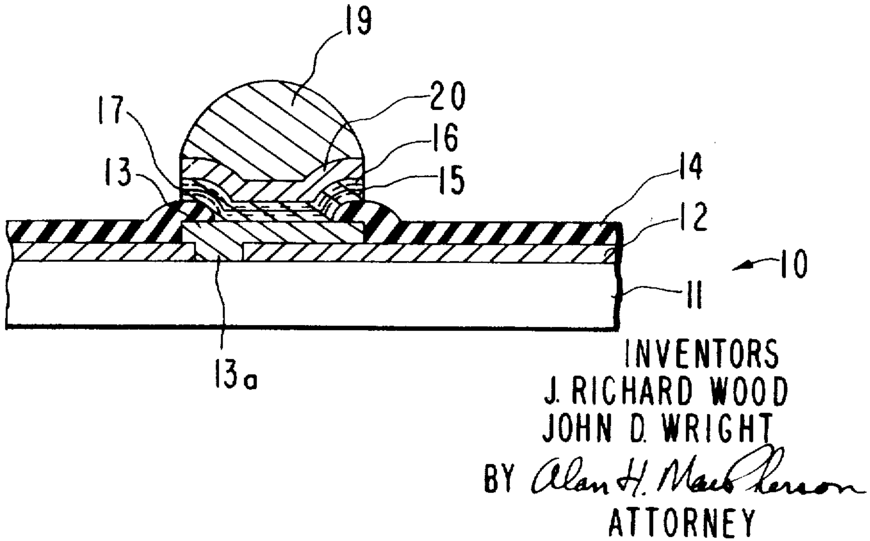
Figure 4:
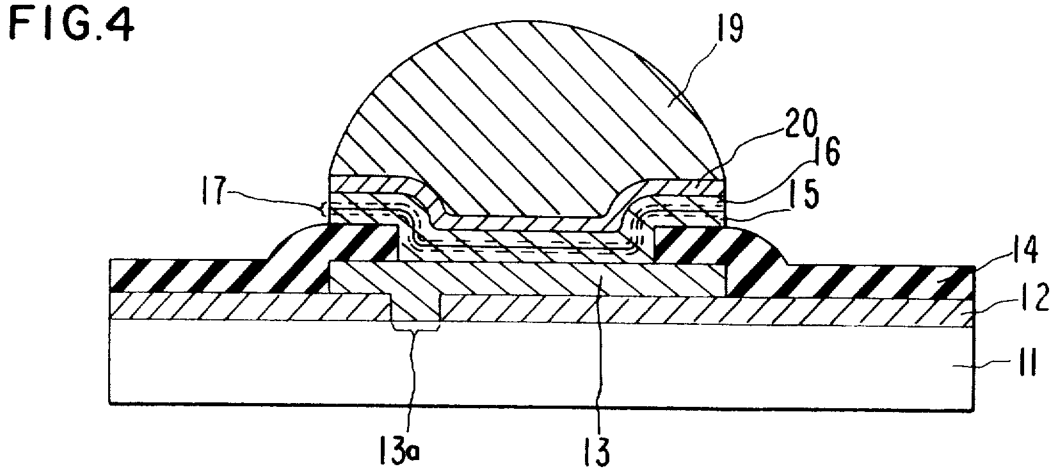
FIG. 4 shows a solder bump produced by the process of FIGS. 2*a* through 2*d*.

FIGS. 2*a* through 2*d* show an alternative embodiment of this invention which is identical to the embodiment shown in FIGS. 1*a* through 1*d* except that rather than using a photoresist layer 18 (FIGS. 1*b* and 1*c*) to define the bump locations, a gold layer 20 (FIG. 2*b*) is so used. Gold 20 effectively serves as a mask for selective etching of titanium-nickel-intermetallic layers 15, 16 and 17 respectively. Upon the completion of the etching, the gold remains on the top surface of the layer 16 and serves as an adhesive layer for the attachment of solder 19, as shown in FIGS. 2*d* and 4.

In placing gold 20 on titanium-nickel-intermetallic layers 15, 16 and 17 respectively, layer 16 is covered with a resist (not shown). The resist is then removed from those portions of the titanium-nickel layer to be covered with gold 20. Next, a layer 20 of gold, perhaps one micron thick, is plated onto the top of the exposed surface of nickel layer 16 using any one of several gold-plating methods. This is followed by stripping the resist from nickel layer 16 and then using the gold 20 as a mask to etch back the exposed nickel, titanium and intermetallic layers 16, 15 and 17 respectively, as in the embodiment shown in FIGS. 1*a* through 1*d*. A rinse in de-ionized water is followed again by a dip in a solder solution as in the first embodiment.

While the barrier and wettable layers of metal used by this invention have been described as being deposited by evaporation, selected ones of these layers may be formed by other methods such as plating. And while the solder has been described as being placed on the wettable nickel layer by dipping, this solder may be so placed by other techniques such as evaporation and plating.

What is claimed is:

1. A solderable silicon semiconductor device comprising:
- a wafer of silicon;
- an electrically-conductive metal contact layer attached to said wafer;
- a layer of titanium overlying and adhering to said metal contact layer;
- a layer of nickel overlying and adhering to said layer of titanium; and
- a plurality of selected solder-forming metals overlying and adherent to said layer of nickel, a selected number of said selected metals comprising solder.

2. The structure of claim 1 including at least one titanium-nickel intermetallic compound between said layer of titanium and said layer of nickel.

3. Structure as in claim 1 wherein said plurality of selected solder-forming metals comprise a lead-tin solder.

4. The structure as in claim 1 wherein said plurality of selected solder-forming metals comprise a layer of gold overlying and adhering to said layer of nickel, a layer of tin overlying and adhering to said layer of gold and a layer of gold overlying and adhering to said layer of tin.

* * * * *